United States Patent [19]

Smith

[11] 4,353,672
[45] Oct. 12, 1982

[54] TEMPLATE DEVICE

[76] Inventor: Gerald T. Smith, 5312 N. Walker, Oklahoma City, Okla. 73118

[21] Appl. No.: 157,249

[22] Filed: Jun. 9, 1980

[51] Int. Cl.³ .................................................. B23C 1/16
[52] U.S. Cl. ...................................... 409/97; 33/174 B; 33/174 G; 144/134 D; 144/144 R; 409/110; 409/130
[58] Field of Search ................... 409/130, 125, 97, 110, 409/104; 33/174 B, 174 G; 144/144 R, 134 D, 136 C

[56] References Cited

U.S. PATENT DOCUMENTS

| 877,894 | 0/1908 | Kelley | 144/144 R |
|---|---|---|---|
| 1,904,109 | 4/1933 | Wendorf | 144/27 |
| 2,182,331 | 12/1939 | Atkins | 409/110 X |
| 2,188,502 | 1/1940 | Emmons | 144/144 |
| 2,536,650 | 1/1951 | Martinez | 144/144 |
| 2,605,790 | 8/1952 | Schwarzer | 144/27 |
| 3,046,667 | 7/1962 | Martineau | 33/174 |
| 3,199,556 | 8/1965 | Wing | 144/144.5 |
| 3,402,641 | 9/1968 | Dawes | 409/122 |
| 3,450,001 | 6/1969 | Fortune | 409/130 |
| 3,540,130 | 11/1970 | French | 33/174 G |
| 3,568,327 | 3/1971 | Furvoka | 33/174 B |
| 3,618,464 | 11/1971 | Michaud, Sr. | 409/97 X |
| 3,841,368 | 10/1974 | Ritter | 144/144 R X |
| 3,875,668 | 4/1975 | Taylor | 33/174 F |
| 3,947,969 | 4/1976 | Gonzalez Martinez | 33/174 B |
| 4,114,664 | 9/1978 | Cotton | 144/144 R X |
| 4,281,694 | 8/1981 | Gorman | 144/134 D |

FOREIGN PATENT DOCUMENTS

1282348 of 1972 United Kingdom .............. 33/174 B

Primary Examiner—William R. Briggs
Attorney, Agent, or Firm—Dunlap & Codding

[57] ABSTRACT

A template device for guiding a cutting tool in cutting engagement with a surface of a work piece to provide ornamental design in the surface of the work piece. The template device comprises a base plate having a base plate opening therein; a carriage support having a carriage support opening therein, the carriage support rotatably positioned within the base plate opening and supported therein by the base plate; a locking assembly for securing the carriage assembly to the base plate such that the carriage is maintained in a selected fixed position with respect to the base plate opening; a carriage assembly secured to the carriage support, the carriage assembly traversing the carriage support opening; and a template assembly having a template opening therein, the template assembly being selectively movable across the carriage support opening via the carriage assembly, the template assembly further being selectively rotatable about its central axis, the template opening adapted to receive and guide the cutting tool in cutting engagement with the surface of the work piece so as to provide the desired designs in the surface of the work piece.

23 Claims, 12 Drawing Figures

TEMPLATE DEVICE

BACKGROUND OF THE INVENTION

1. Field of the Invention

This invention relates to templates, and more particularly, but not by way of limitation, to a template for guiding a cutting tool in cutting engagement with a surface of a work piece to provide ornamental designs in the surface of the work piece.

Heretofore, various templates have been proposed for providing designs in a work surface of a work piece, such as a flat panel used for cabinet doors, drawer fronts, and the like. However, such prior art templates, while meeting with some success, have not provided the workman with the desired flexibility to provide ornamental designs on substantially any portion of the panel to which the template has been secured. Thus, many of the prior art devices have required the workman to continuously remove and reset the template if one desires to have access to substantially the entire working surface of the work piece to which the template is attached. As is apparent, when the workman must relocate the template, or reposition same, not only is much time wasted but it is often difficult to properly and precisely position the template so that the cutting tool will provide the desired ornamental design on the work piece. Thus, new and improved template devices for guiding a working tool in cutting engagement with the working surface of a work piece to provide a desired ornamental design in the surface of the work piece are desired and being sought which enables the workman to have access to substantially all of the surface of the piece to which the template is attached without the requirement of resetting or repositioning of the entire template device.

2. Summary of the Invention

According to the present invention an improved template device for guiding a cutting tool in cutting engagement with a surface of a work piece is provided wherein the template device enables the workman to have access to substantially all of the surface of the work piece to which the template device is secured,. Broadly, the template device of the present invention provides the workman with a combination of rotational and horizontal movements across the working surface of the work piece and comprises a base plate having a base plate opening therein; a carriage support having a carriage support opening therein, the carriage support being rotatably disposed in the base plate opening of the base plate and supported therein by the base plate; a first locking assembly for securing the carriage support in a selected fixed position within the base plate opening; a carriage assembly transversely disposed across the carriage support opening, the carriage assembly being operably connected to and supported by the carriage support; and a template assembly having a template opening therein, the template assembly being supported by the carriage assembly such that the template assembly is selectively movable across the carriage support opening via the carriage assembly, the template assembly further being selectively rotatable about its central axis, the template opening of the template assembly being adapted to guide the cutting tool in cutting engagement with the surface of the work piece to provide the desired ornamental design in the surface of the work piece.

An object of the present invention is to provide an improved template which may be secured to a work piece, such as a wood panel or plywood sheet, for providing desired ornamental designs in the surface of the work piece.

Another object of the present invention is to provide an improved template for guiding a cutting tool in cutting engagement with a surface of a work piece wherein substantially all of the surface of the work piece enclosed by the template is available to the workman so that the cutting tool can be guided in cutting engagement with the surface of the work piece via the template.

Another object of the present invention is to provide a template for guiding a cutting tool to provide desired ornamental designs in the surface of a work piece wherein repetitive designs can be formed in the surface of the work piece, as well as in subsequent work pieces.

Another object of the present invention is to provide an improved template which is economical to manufacture, simplified in construction, efficient in operation, which will not readily deteriorate or become inaccurate through use, and which does not suffer from the disadvantages of the prior art devices.

These and other objects, advantages and features of the present invention will become apparent to those skilled in the art from a reading of the following detailed description when read in conjunction with the accompanying drawings which illustrate the invention, and with the appended claims.

DETAILED DESCRIPTION OF THE PREFERRED EMBODIMENTS

Figure 1:
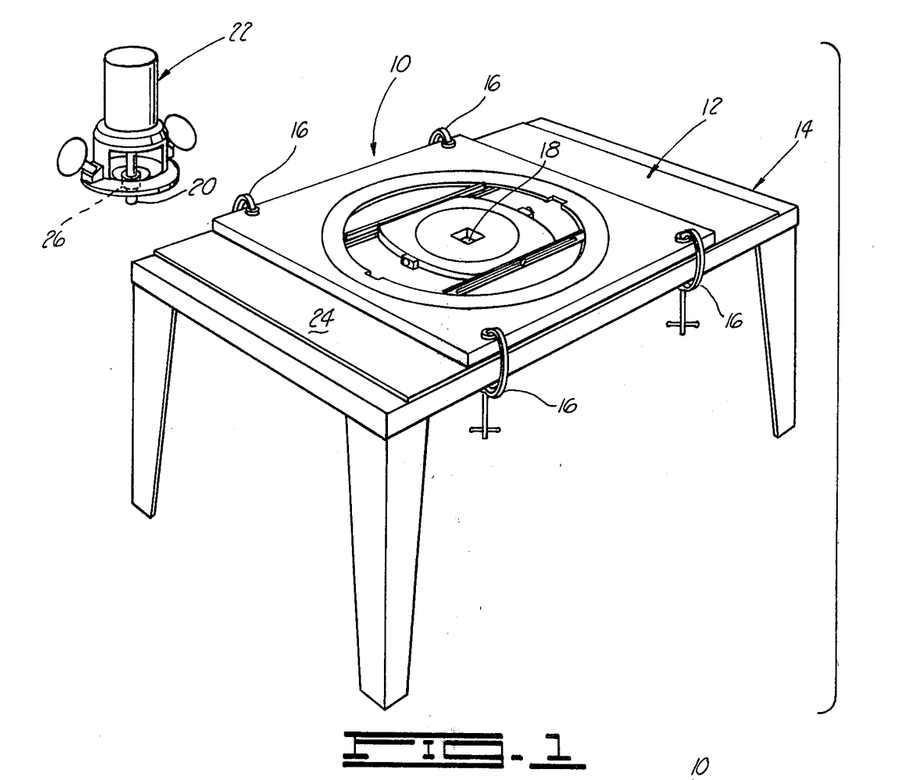
FIG. 1 is a perspective view depicting the template device of the present invention secured to a work piece such that upon engagement of a cutting tool with a working surface of the work piece via the template device an ornamental design can be produced in the working surface of the work piece.
Figure 2:
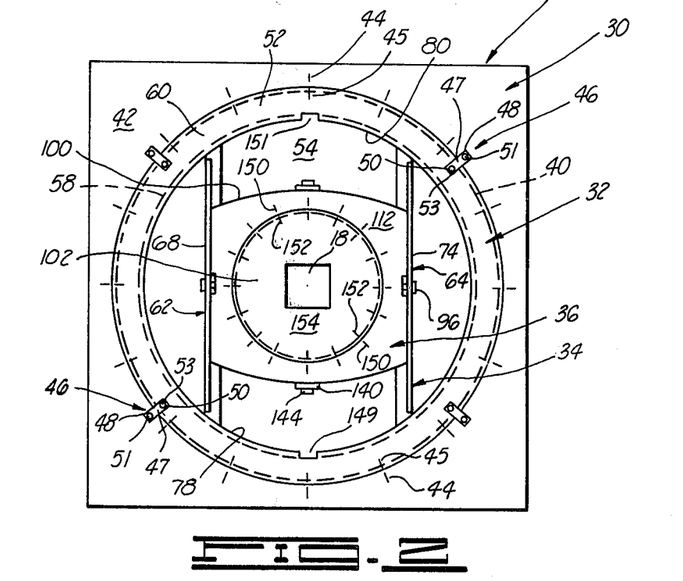
FIG. 2 is a plan view of the template device of the present invention.

Referring to the drawings, and particularly to FIGS. 1 and 2, a template device 10, constructed in accordance with the present invention, is positioned upon a wooden panel work piece 12 supported by a work bench 14. The template device 10 is firmly positioned upon the wooden panel work piece 12 via a plurality of clamp assemblies 16 substantially as shown in FIG. 1.

The template device 10 is provided with a template opening 18 which receives and guides a cutting tool 20 of a router 22 so that the cutting tool 20 can be guided in cutting engagement with a surface 24 of the wooden panel work piece 12 to provide a desired ornamental design in the surface 24. The router device 22 is further provided with a guide bushing 26 which operably engages the template opening 18 of the template device 10. The router 22, the guide bushing 26, and the cutting tool 20 are well known in the art. Thus, no further description of such components is believed necessary herein for one to fully understand the template device 10 of the present invention.

Figure 3:
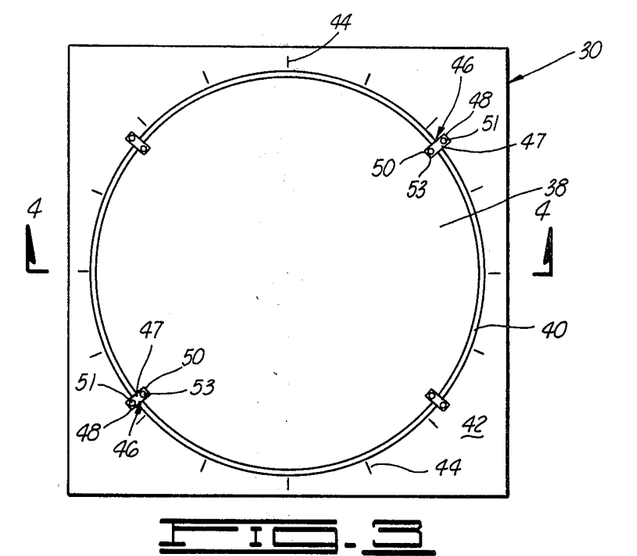
FIG. 3 is a plan view of the base plate of the template device of FIG. 2 having the carriage support, the carriage assembly, and the template assembly removed therefrom.
Figure 4:
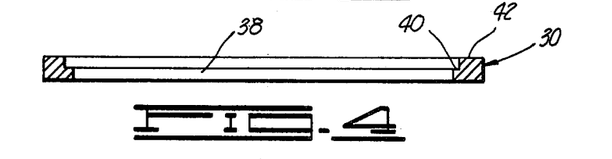
FIG. 4 is a cross-sectional view of the base plate of FIG. 3 taken along the line 4—4.

Referring more specifically to FIGS. 2, 3 and 4, the template device 10 comprises a base plate 30, a carriage support 32, a carriage assembly 34, and a template assembly 36. The base plate 30 is provided with a base plate opening 38 therein, depicted as a generally circular shaped opening, and the base plate 30 is further provided with a recessed shoulder portion 40 formed through an upper side 42 of the base plate 30, the recessed shoulder portion 40 being peripherally disposed around the base plate opening 38 substantially as shown in FIGS. 3 and 4. The base plate 30 is further provided with a plurality of indicia 44 on the upper side 42 thereof, the indicia 44 being alignable with a plurality of indicia 45 on the carriage support 32 for indicating the position of the carriage support 32 with respect to the base plate 30.

When it is desirable to secure the carriage support 32 in a fixed position with respect to the base plate 30, a plurality of locking members 46 operably interconnect the base plate 30 to the carriage support 32 to prevent rotational movement of the carriage support 32 with respect to the base plate 30 when same are in the secured, locked condition.

The locking members 46 are depicted as substantially rectangular shaped plate members 47 having a first end portion 48 and an opposed second end portion 50. Each of the first and second end portions 48, 50 are provided with apertures (not shown) through which fasteners, such as anchor screws 51, 53 can be positioned so that the first end portion 48 of each of the plate members 47 can be secured to the base plate 30, and the opposed second end portion 50 of each of the plate members 47 can be detachably connected to the carriage support 32. Thus, in an assembled position the plate members 47 and the anchor screws 51, 53 lock or secure the carriage support 32 to the base plate 30 in a desired fixed position.

Figure 5:
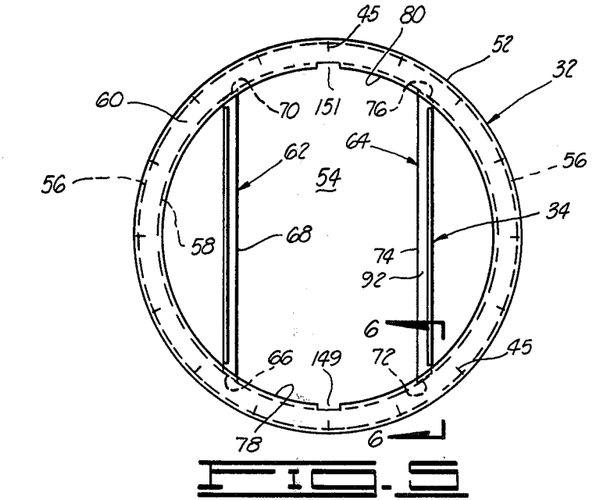
FIG. 5 is a plan view of the carriage support of the template device of the present invention, the carriage support having the carriage assembly mounted thereon.
Figure 6:
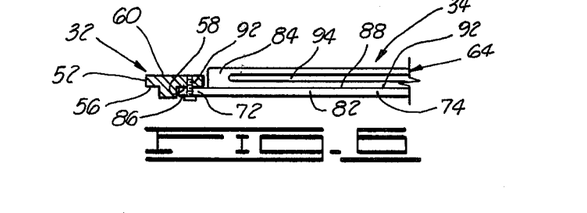
FIG. 6 is a cross-sectional view of the carriage support and carriage assembly of the template device of FIG. 5 taken along the line 6—6.

Referring now to FIGS. 2, 5 and 6, the carriage support 32 is, as previously discussed, supported in the base plate opening 38 of the base plate 30 via the recessed shoulder portion 40 thereof. The carriage support 32 comprises a generally circular shaped carriage support plate 52 having a substantially centrally disposed carriage support opening 54. The carriage support plate 52 is provided with a first outer rim portion 56 disposed along the perimeter thereof; and a second inner rim portion 58 disposed peripherally around the carriage support opening 54. As previously stated, the carriage support opening 54 is substantially centrally disposed within the carriage support plate 52 as shown in FIGS. 5 and 6. In the assembled position of the carriage support plate 52 and the base plate 30 of the template device 10, the carriage support plate 52 is rotatably supported in the base plate opening 38 of the base plate 30 via the recessed shoulder portion 40 of the base plate 30 and the first outer rim portion 56 of the carriage support plate 52 such that the upper side 42 of the base plate 30 is substantially coplanar with an upper side 60 of the carriage support plate 52.

The carriage assembly 34 is operably connected to the carriage support plate 52 of the carriage support 32 so that the carriage assembly 34 traverses the carriage support opening 54 in the carriage support plate 52. The carriage assembly 34 comprises a pair of substantially parallel, spatially disposed rail members 62, 64.

The rail members 62, 64, which support the template assembly 36 in the carriage support opening 54 of the carriage support plate 52 are secured to the carriage support plate 52 via the second inner rim portion 58 of the carriage support plate 52 so that the rail members 62, 64 are disposed generally transverse to the carriage support opening 54.

The rail member 62 is provided with a first end 66, a medial portion 68, and an opposed second end 70; and the rail member 64 is provided with first end 72, a medial portion 74, and an opposed second end 76. The first ends 66, 72 of the rail members 62, 64, respectively, are secured to a first side portion 78 of the carriage support plate 52 via the second inner rim portion 58 thereof; and the opposed second ends 70, 76 of the rail members 62, 64, respectively, are secured to a second portion 80 of the carriage support plate 52 via the second inner rim portion 58 thereof such that the medial portions 68, 74 of the rail members 62, 64, respectively, generally traverse the carriage support opening 54 of the carriage support plate 52.

As previously stated, the rail members 62, 64 are transversly disposed across the carriage support opening 54 of the carriage support plate 52 and supportingly engage the template assembly 36 as shown in FIGS. 1 and 2. Each of the rail members 62, 64 are substantially identical in construction and function. Thus, only a detailed description of the rail member 64 will be set forth hereinafter.

Figures 7, 8, 11:
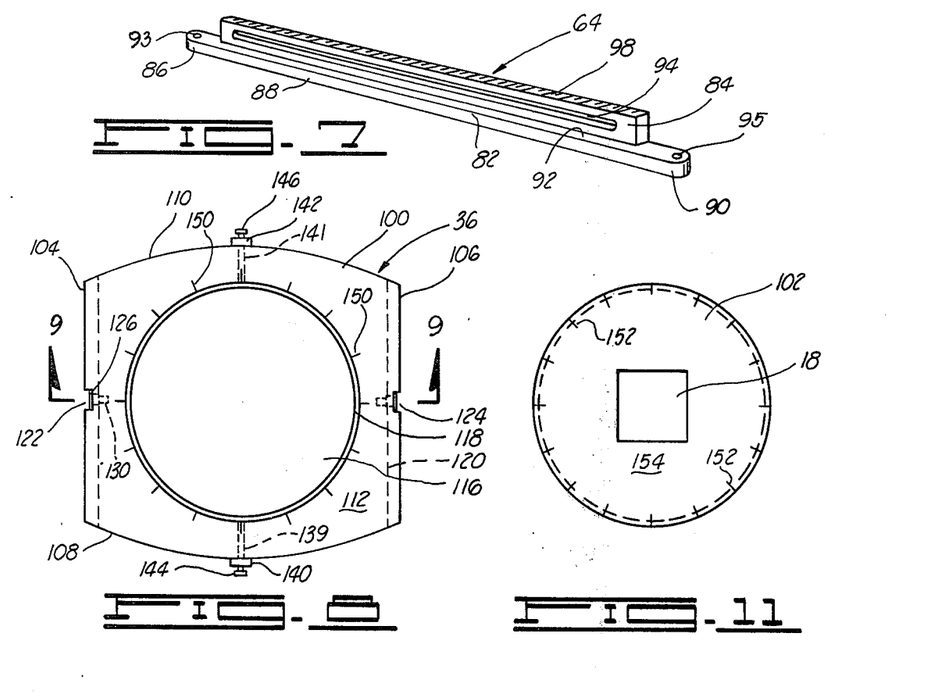
FIG. 7 is an enlarged, perspective view of one rail member of the carriage assembly of the template device of the present invention.
FIG. 8 is a plan view of the template support plate of the template device of the present invention, the template support plate having the template removed therefrom.
FIG. 11 is a plan view of the template of the template device of the present invention, the template being depicted as having a substantially square shaped template opening therein.

Referring now to FIGS. 6 and 7, the rail member 64 (depicted as an angle guide member), comprises a first side member 82 and a second side member 84. The first side member 82 is provided with a first end 86, a medial portion 88, and an opposed second end 90. The medial portion 88 of the first side member 82 is depicted as that portion of the first side member 82 disposed within the carriage support opening 54 of the carriage support plate 52. The second side member 84 of the rail member 64 is disposed on the medial portion 88 of the first side member 82 so as to be substantially vertically extended therefrom. In other words, the second side member 84 of the rail member 64 extends upwardly into the carriage support plate opening 54 of the carriage support plate 52 substantially as shown in FIG. 6.

The first and opposed second ends 86, 90 of the first side member 82 of the rail member 64 are each provided with an aperture 93, 95 therein. Thus, the first end 86 of the first side member 82 can be connected to the first side portion 78 of the carriage support plate 52 via the second inner rim portion 58 thereof by any suitable means, such as an anchor screw (not shown); and the opposed second end 90 of the first side member 82 can be connected to the second portion 80 of the carriage support plate 52 via the second inner rim portion 58 thereof by any suitable means, such as an anchor screw (not shown).

By securing the rail member 64 (and in like manner the rail member 62) to the carriage support plate 52 as described, the rail member 64, generally traverses the carriage support plate opening 54 of the carriage support plate 52 such that an upper surface 92 of the medial portion 88 of the rail member 64 supportably engages the template assembly 36. Thus, the template assembly 36 can be selectively moved across the carriage support plate opening 54 of the carriage support plate 52 via the rail members 62, 64.

As previously stated, the second side member 84 of the rail member 64 extends from the medial portion 88 of the first side member 82 so that the second side member 84 is disposed in the carriage support plate opening 54 of the carriage support plate 52. Further, as can be readily seen in FIG. 7, the first side member 82 and the second side member 84 cooperate to form a substantially L-shaped guide rail member.

The second side member 84 of the rail member 64 is provided with a longitudinally disposed elongated slot 94 therein, the elongated slot 94 being adapted to receive a locking member 96 (shown in FIG. 2) for securing the template assembly 36 in a substantially fixed position on the rail member 64 (and the rail member 62) once the template assembly 36 has been selectively positioned within the carriage support plate opening 54 of the carriage support plate 52 as will be more fully described hereinafter. Since it is desirable, when employing the template device 10 of the present invention, to be able to readily determine the position of the template assembly 36 with respect to the rail members 62, 64 in order to position the template assembly 36 at a proper position within the carriage support plate opening 54 of the carriage support plate 52, each of the rail members 62, 64 are provided with indicia on the second side member, such as indicia 98 on the second side member 84 of the rail member 64 as shown in FIG. 7. Thus, the operator can selectively and reproducibly position the template assembly 36 on the rail members 62, 64 and readily repeat a design on the same wooden panel work piece 12 or a subsequent work piece.

Referring now to FIGS. 8-12, the template assembly 36 is more clearly depicted. As previously indicated, the template assembly 36 is supported by the rail members 62, 64, the carriage support plate 52, and the base plate 30 such that the template assembly 36 is selectively movable across the carriage support plate opening 54 of the carriage support plate 52 via the rail members 62, 64, and, at the same time, the template assembly 36 is selectively rotatable about its central axis.

The template assembly 36 comprises a template support plate 100, and a template 102 having the template opening 18 disposed therein. The template support plate 100 is slidably mounted on the rail members 62, 64 of the carriage assembly 34 so that the template support plate 100 can be selectively moved along the rail members 62, 64 so that the template support plate 100, and thus the template 102 can be selectively positioned within the carriage support plate opening 54 of the carriage support plate 52.

Figure 9:
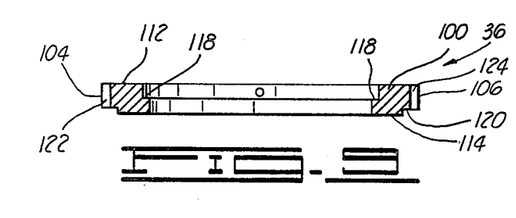
FIG. 9 is a cross-sectional view of the template support plate of FIG. 8 taken along the line 9—9.
Figure 10:
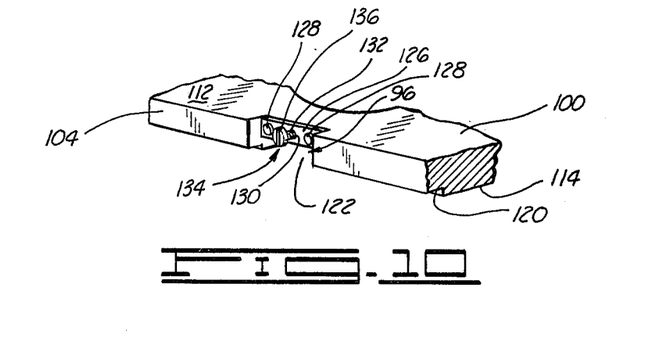
FIG. 10 is a fragmental, perspective view depicting locking means for securing the template support plate to the rail member of the carriage assembly of the template device of the present invention.
Figure 12:
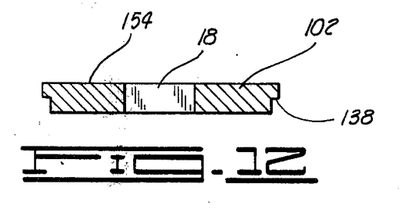
FIG. 12 is a cross-sectional view of the template of FIG. 11 taken through the central portion of the template.

Referring now to FIGS. 8-10, the template support plate 100 is provided with a first side 104, a substantially parallel opposed second side 106, a first end 108, an opposed second end 110, an upper side 112, and a lower side 114. The first and opposed second sides 104, 106 of the template support plate 100 are positioned substantially adjacent the second side members of the rail members 62, 64 (such as the second side member 84 of the rail member 64) and the template support plate 100 is supported upon the first side members of each of the rail members 62, 64 (such as the first side member 82 of the rail member 64). The first and opposed second ends 108, 110 of the template support plate 100 are provided with a substantially convex configuration which corresponds with the curvature of the carriage support plate opening 54 of the carriage support plate 52. Thus, in an assembled position wherein the template support plate 100 is positioned upon the rail members 62, 64, the template support plate 100 can be selectively moved across the carriage support plate opening 54 from a position (wherein the first end 108 of the template support plate 100 is disposed substantially adjacent the first side portion 78 of the carriage support plate 52) to a second position (wherein the opposed second end 110 of the template support plate 100 is disposed substantially adjacent the second side portion 80 of the carriage support plate 52).

The template support plate 100 is further provided with a template support opening 116 therein, the template support opening 116 being depicted as having a substantially circular configuration and centrally disposed in the template support plate 100. The template support plate 100 further comprises a recessed shoulder portion 118 and a rim portion 120. The recessed shoulder portion 118 of the template support plate 100 is formed in the template support plate 100 through the upper side 112 thereof such that the recessed shoulder portion 118 is disposed peripherally around the template support opening 116 of the template support plate 100. The recessed shoulder portion 118 of the template support plate 100 supportingly receives the template 102 so that the template 102 can be rotatably disposed within the template support opening 116 of the template support plate 100.

The rim portion 120 of the template support plate 100 is formed through the lower side 114 of the template support plate 100 such that the rim portion 120 extends along each of the first and opposed second side 104, 106 of the template support plate 100 substantially as shown in FIG. 9. Thus, when the template support plate 100 is positioned upon the rail members 62, 64 of the carriage assembly 34, the rim portion 120 of the first and opposed second sides 104, 106 of the template support plate 100 engage the first side members of the rail members 62, 64 (such as the first side member 82 of the rail member 64 depicted in FIG. 7) so that the template support plate 100 is movably supported thereon.

The first and second sides 104, 106 of the template support 100 are further provided with recessed portions 122, 124 disposed therein. The recessed portions 122, 124 are substantially identical in construction. Thus, only a detailed description of the recessed portion 122 will be described with reference to FIG. 10.

A plate member 126 is disposed within the recessed portion 122 of the first side 104 of the template support plate 100 and secured therein by any suitable means, such as by providing apertures (not shown) within the end portions of the plate member 126 and thereafter securing the plate member 126 within the recessed portion 122 by a plurality of screw members 128 threadably positioned through the apertures (not shown) of the plate member 126. The plate member 126 is further provided with a threaded aperture 130, the threaded aperture 130 adapted to threadably receive a threaded shank portion 132 of a bolt 134. Thus, when the template support plate 100 is positioned upon the rail members 62, 64, as hereinbefore described, the template support plate 100 can be secured thereto in a fixed position by positioning the threaded shank portion 132 of the bolt 134 through the elongated slot in the second side member of one of the rail members 62, 64, (such as the elongated slot 94 in the second side member 84 of the rail member 64) such that the threaded shank portion 132 of the bolt 134 threadably engages the threaded aperture 130 of the plate member 126. Thereafter, by applying torque to a head portion 136 of the bolt 134 the threaded shank portion 132 of the bolt 134 can be driven into the threaded aperture 130 of the plate member 126 and the template support plate 100 secured to the rail member 62 in a substantially fixed position. On the other hand, when a torque is applied to the head portion 136 of the bolt 134 in an opposite direction the bolt 134 is loosened and the template support plate 100 can be selectively moved along the rail members 62, 64 as hereinbefore described.

The template 102 is provided with the template opening 18 therein. The template 102 is rotatably positioned within the template support opening 116 of the template support plate 100 and supported therein by the recessed shoulder portion 118 of the template support plate 100 so that the template 102 can be selectively rotated about its central axis. As more clearly shown in FIGS. 11 and 12, the template 102, depicted as having a generally circular configuration, is provided with a rim portion 138 peripherally disposed along the perimeter of the template 102. Thus, template support plate 100 is rotatably supported within the template opening 116 of the template support plate 100 via the rim portion 138 of the template 102 and the recessed shoulder portion 118 of the template support plate 100.

In order to secure the template 102 in a fixed position within the template support opening 116 of the template support plate 100, the first and opposed second ends 108, 110 of the template support plate 100 are each provided with a bore 139, 141 (indicated by phantom lines in FIG. 8) extending therethrough. Plate members 140 and 142, each having a threaded aperture (not shown) provided therein, are secured to the first and opposed second ends 108, 110 of the template support plate 100 substantially as shown in FIG. 8. Threaded bolt members 144, 146 are threadably positioned within the threaded apertures (not shown) of the plate members 140, 142, and the threaded apertures (not shown) of the plate members 140, 142 are aligned with the bores 139, 141 extending through the first and opposed second ends 108, 110 of the template support plate 100, such that upon threadably engaging the bolts 144, 146 with the threaded apertures (not shown) of the plate members 140, 142, the bolt members 144, 146 can be driven through the bores 139, 141 of the first and opposed second ends 108, 110 of the template support plate 100 and into engagement with the portion of the template 102 disposed within the template support opening 116 of the template support plate 100. When the bolts 144, 146 engage the template 102, as set forth above, the template 102 is secured in a substantially fixed position within the template support opening 116 of the template support plate 100.

As previously stated, in an assembled position of the template device 10 of the present invention the template support plate 100 supported by the rail members 62, 64 can be selectively moved across the carriage support plate opening 54 of the carriage support plate 52 between the first position of the template support plate (wherein the first end 108 of the template support plate 100 is disposed substantially adjacent the first side portion 78 of the carriage support plate 52) and the second position of the template support plate 100 (wherein the opposed second end 110 of the template support plate 100 is disposed substantially adjacent the second side portion 80 of the carriage support plate 52). As shown in FIG. 2, the plate members 140, 142 and the threaded bolt members 144, 146 utilized (in combination with the threaded bores 139, 141 in the first and opposed second ends 108, 110, respectively of the template support plate) to secure the template 102 in a fixed position with respect to the template support plate 100 extend outwardly from the first and opposed second ends 108, 110 of the template support plate 100. Thus, the first portion 78 of the carriage support plate 52 is provided with a recessed portion 149, for receiving the plate member 140 and the bolt member 144 of the template support plate 100 when the template support plate 100 is in the above-described first position. Similarly the second side portion 80 of the carriage support plate is provided with a recessed portion 151 for receiving the plate member 142 and the bolt member 146 of the template support plate 100 when the template support plate 100 is in the above-described second position.

The template opening 18 of the template 102 is depicted in FIGS. 1, 2 and 11 as having a geometrical configuration, namely, a square-shaped configuration. However, it is to be understood that the template opening 18 of the template 102 can have any desired configuration, such being determined to a large degree by the particular design desired to be formed on the surface 24 of wooden panel work piece 12 via the cutting tool 20 of the router 22.

In order to readily enable the operator to position the template 102 in a desired position within the template support opening 116 of the template support plate 100, the template support plate 100 and the template 102 are each provided with a plurality of indicia which can be aligned, one with the other, to insure the desired positioning of the template 102. Such can be accomplished by providing a plurality of indicia 150 on the upper side 112 of the template support plate 100 so that the indicia 150 are substantially disposed around the template support opening 116 of the template support plate 100 substantially as shown in FIGS. 2 and 8. Similarly, a plurality of indicia 152 are disposed on upper surface 154 of the template 102, the indicia 152 being disposed along the perimeter of the template 102 substantially as shown in FIGS. 2 and 11. Thus, the indicia 152 of the template 102 are alignable with the indicia 150 of the template support plate 100 so that the operator can readily determine the desired position of the template 102 with respect to the template support plate 100. Once the template 102 has been moved to the desired position within the template support plate 100, the template 102 can be secured in a fixed position as hereinbefore described.

In order to further illustrate the template device 10 of the present invention, and its use with the wooden panel work piece 12 to provide a desired design in the surface 24 thereof with the cutting tool 20 of a router 22, the following modes of operation of same will be presented with reference to FIGS. 1 and 2. Initially, a suitable flat surface, such as the work bench 14 is selected, the work bench 14 having a size at least equal in size to the template device 10. The material in which the design is to be cut, such as the wooden panel work piece 12, is then selected and positioned upon the work bench 14 so that the surface 24 of the wooden panel work piece 12 on which the design is to be made is in a facing relationship with the template device 10. It should be noted that if the wooden panel work piece 12 is smaller than the size of the template device 10, shims can be positioned between the template device 10 and the work bench 14 to maintain the template device 10 in the desired flat position. Once the wooden panel work piece 12 has been positioned upon the work bench 14 the template device 10 is positioned thereupon and secured by any suitable means, such as with the clamps 16.

In positioning the template device 10 upon the wooden panel work piece 12 the template device 10 is positioned so as to be substantially centered over the design location to be cut in the surface 24 of the wooden panel work piece 12. The template 102 having the template opening 18 with the desired configuration is then positioned within the template support opening 116 of the template support plate 100 and secured thereto in a fixed position. Prior to securing the template 102 in the fixed position, the position of the carriage support plate 52, with respect to the base plate 30, is checked and the carriage support plate 52 is secured in the desired position. Similarly, the position of the template support plate 100 with respect to the rail members 62, 64 is likewise checked so that the template support plate 100 is secured in the desired position with respect thereto.

Once the proper template 102 has been selected and secured within the template support opening 116 of the template support plate 100, and the carriage support plate 52 has been properly positioned and secured, the cutting tool 20 of the router 22 is positioned through the template opening 18 of the template 102 such that the guide bushing 26 of the router 22 rests against the portion of the template 102 defining the template opening 18. The router 22 is then activated and the cutting tool 20 is directed into cutting engagement with the surface 24 of the wooden panel work piece 12 to produce the desired pattern (as dictated by the configuration of the template opening 18) via the guide bushing 26 of the router 22 following the template opening 18 in the template 102.

Once the first cut has been made, (e.g., the cutting tool 20 has produced a design in the surface 24 of the wooden panel work piece 12 corresponding to the shape of the template opening 18), the template opening 18 is selectively positioned over another portion of the surface 24 of the wooden panel work piece 12 by selectively moving either the carriage support plate 52, the template support plate 100, or the template 102, including combinations thereof, to selectively position the template opening 18 of the template 102 in a desired position so that the cutting tool 20 can cuttingly engage the cutting surface 24 of the wooden panel work piece 12 to continue the formation of the desired design within the surface 24.

As is evident, the template device 10 of the present invention allows one to have ready access to the surface 24 of a wooden panel work piece 12 (via the template opening 18 of the template 102 which selectively directs the cutting tool 20 of the router 22 into cutting engagement with the surface 24 of the wooden panel work piece 12) while providing the operator with a plurality of rotational movements (via the carriage support plate 52 and the template 102), and the transverse movement across the surface 24 of the wooden panel workpiece 12 (via the template support plate 100 and the rail members 62, 64), without requiring the operator to readjust or move the base plate 30 of the template device 10. Thus, the template device 10 of the present invention provides the operator with access to substantially all portions of the surface 24 of the wooden panel work piece 12 disposed within the boundaries of the carriage support plate opening 54 of the carriage support plate 52 without requiring the operator to reposition the template device 10 on the wooden panel work piece 12.

It is clear that the present invention is well adapted to carry out the objects and obtain the ends and advantages mentioned, as well as those inherent therein. While a presently preferred embodiment of the present invention has been described for purposes of this disclosure, numerous changes will be made which will readily suggest themselves to those skilled in the art and which are encompassed within the spirit of the invention disclosed and defined in the appended claims.

I claim:

1. A template device for guiding a cutting tool in cutting engagement with a surface of a work piece comprising:

a base plate having a base plate opening therein;

a carriage support rotatably supported by the base plate in the base plate opening, the carriage support having a carriage support opening therein;

first locking means for securing the carriage support in a selected fixed position within the base plate opening;

a carriage assembly mounted on the carriage support such that the carriage assembly generally traverses the carriage support opening; and a template assembly supported by the carriage assembly, comprising:

a template support plate slideably mounted on the carriage assembly such that the template support plate can be moved along the carriage assembly to selectively position the template support plate within the carriage support opening, the template support plate having a template support opening therein; and a template supported by the template support plate such that the template is selectively rotatable about its central axis, the template having a template opening therein.

2. The device of claim 1 wherein the base plate comprises:

a recessed shoulder portion formed in the base plate through an upper surface thereof, the recessed shoulder portion disposed peripherally around the base plate opening and adapted to receive and rotatably support the carriage support thereon.

3. The device of claim 1 wherein the first locking means comprises:

at least one plate member having a first end portion and an opposed second end portion, the first end portion of the plate member detachably connected to the base plate, the opposed second end portion of the plate member detachably connectable to the carriage support such that in a connected position of the second end portion of the plate member the carriage support is secured in a fixed position with respect to the base plate, and in a disconnected position of the second end portion of the plate member the carriage support is rotatable with respect to the base plate.

4. The device of claim 1 wherein the carriage support comprises a support plate, the support plate having a first rim portion peripherally disposed along the perimeter thereof and a second rim portion disposed peripherally around the carriage support opening, the first rim portion engaging the base plate when the carriage support is positioned within the base plate opening.

5. The device of claim 1 wherein the carriage assembly comprises:
a pair of substantially parallel, spatially disposed rail members, each of the rail members having a first end and an opposed second end, the first end of each of the rail members secured to the carriage support plate, the opposed second end of each of the rail members secured to an opposed second portion of the carriage support plate such that the rail members generally traverse the carriage support opening.

6. The device of claim 1 wherein the template assembly further comprises:
second locking means for securing the template support plate in a selected fixed position on the carriage assembly; and
third locking means for securing the template in a selected fixed position within the template support opening.

7. The device of claim 1 wherein each of the rail members is an angle guide rail member comprising:
an elongated first side member havng a first end, an opposed second end, and an upper supporting surface; and
a second side member substantially vertically extending from a portion of the first side member traversing the carriage support opening such that the second member is substantially disposed within the carriage support opening, the second side member having a longitudinally disposed elongated slot therein adapted to receive the second locking means for securing the template support plate to the angle guide rail.

8. The device of claiim 7 wherein the template support plate comprises:
a recessed shoulder portion formed in the template support plate through an upper surface thereof, the recessed shoulder portion disposed peripherally around the template support opening and adapted to receive and rotatably support the template thereon.

9. The device of claim 8 wherein the template comprises a rim portion peripherally disposed along the perimeter thereof, the rim portion of the template engaging the recessed shoulder portion of the template support plate when the template is positioned within the template support opening.

10. The device of claim 8 wherein the template support plate further comprises:

a rim portion peripherally disposed along the perimeter thereof, the rim disposed on a lower surface of the template support plate and engaging the upper supporting surface of the angle guide rail member when the template support plate is positioned thereon.

11. The device of claim 10 wherein the template support plate is provided with a first and an opposed second side, the first and opposed second sides being parallel one with the other, one of the first and opposed second sides being disposable substantially adjacent the second side member of one of the angle guide members of the rail members, the other of the first and opposed second sides being substantially adjacent the other of the angle guide members, the template support plate further provided with a first end and opposed second end, the first and opposed second ends each having a convex configuration which substantially corresponds with the curvature of the carriage support opening such that in an assembled position the template support plate is selectively movable across the carriage support opening along the angle guide member from a position wherein the first end of the template support plate is disposed substantially adjacent a portion of the carriage support plate defining the carriage support opening to a position wherein the opposed second end of the template support plate is disposed substantially adjacent a portion of the carriage support plate defining the carriage support opening.

12. The device of claim 7 which further comprises:
first indicia means disposed on the base plate and the carriage support for indicating the position of the carriage support with respect to the base plate;
second indicia means disposed on the carriage assembly for indicating the position of the template assembly with respect to the carriage assembly as the template assembly is movable across the carriage support opening; and
third indicia means disposed on the template assembly for indicating the rotational position of the template assembly.

13. The device of claim 12 wherein each of the base plate opening, the carriage support opening and the template support plate opening have a generally circular configuration, each of the opening are substantially centrally disposed in each of the base plate, the carriage support and the template support plate, and wherein the third indicia means comprises:
a plurality of first template indicia disposed around the template opening in the template support plate; and
a plurality of second template indicia disposed along the perimeter of the template such that upon aligning the first template indicia with the second template indicia the rotatable position of the template with respect to the template support plate and thus the surface of the work piece can be determined.

14. The device of claim 1 which further comprises:
clamping means for securing the base plate of the device in a secured stable position adjacent the surface of the work piece.

15. A routing template device for producing preselected geometrical designs in a working surface of a material wherein the device is used in combination with a cutting tool, the device comprising:
a base plate having a generally circular shaped base plate opening therein and a recessed shoulder portion peripherally disposed around the base plate opening via an upper side of the base plate;

a generally circular shaped carriage support plate having a generally circular shaped carriage support plate opening therein, the carriage support plate further characterized as having a first rim portion disposed along the perimeter thereof, and a second rim portion disposed peripherally around the carriage support opening, the carriage support plate rotatably supported in the base plate opening via the recessed shoulder portion of the base plate and the first rim portion of the carriage support plate such that the upper side of the base plate is substantially coplanar with an upper side of the carriage support plate;

first locking means connectable to the base plate and the carriage support plate for securing the carriage support plate in a predetermined fixed position within the base plate opening;

a template assembly operably disposed in the carriage support plate opening, comprising:

a template support plate having a first side, a substantially parallel opposed second side, a first end, an opposed second end, an upper side and a lower side, the template support plate further characterized as having a generally circular shaped template support plate opening therein; and a template having a template opening therein, the template rotatably positioned within the template support plate opening and supported therein;

guide rail means for supporting the template assembly in the carriage support plate opening, the guide rail means being secured to the carriage support plate via the second rim thereof such that the guide rail means generally traverse the carriage support plate opening and supportingly engage the template assembly; and second locking means connectable to the guide rail means and the template assembly for securing the template assembly to the guide rail means in a predetermined position within the carriage support opening traversed by the guide rail means.

16. The device of claim 15 wherein the template assembly further comprises:

locking means connectable to the template support plate and the template for securing the template in a predetermined fixed, rotational position within the template support plate.

17. The device of claim 15 wherein the template support plate comprises:

a recessed shoulder portion formed in the upper side thereof, the recessed shoulder portion extending peripherally around the template support opening and adapted to receive and rotatably support the template thereon; and a rim portion formed in the lower side thereof, the rim portion extending along each of the first and opposed second sides of the template support plates such that in an assembled position the rim portions of the first and second sides of the template support plate engage the guide rail means so that the template support plate is supported by the guide rail means.

18. The device of claim 17 wherein the template comprises a rim portion peripherally disposed along the perimeter thereof such that in an assembled position the rim portion of the template engages the recessed shoulder portion of the template support plate and is rotatably supported in the template support plate opening.

19. The device of claim 18 wherein the first and opposed second ends of the template support plate are each provided with a convex configuration which substantially corresponds to the curvature of the carriage support opening such that in an assembled position the template support plate is selectively movable across the carriage support opening along the guide rail means from a position wherein the first end of the template support plate is disposed substantially adjacent a portion of the carriage support plate defining the carriage support opening to a position wherein the opposed second end of the template support plate is disposed substantially adjacent a portion of the carriage support plate defining the carriage support opening.

20. The device of claim 19 wherein the guide rail means comprises:

a pair of substantially parallel, spatially disposed rail members, each of the rail members having a first end and an opposed second end, the first end of each of the rail members secured to the carriage support plate via a first portion of the second rim portion of the carriage support plate, the opposed second end of each of the rail members secured to an opposed second portion of the second rim portion of the carriage support plate such that the rail members generally traverse the carriage support opening.

21. The device of claim 20 wherein each of the rail members comprises:

an elongated first side member having a first end, an opposed second end, and an upper supporting surface; and a second side member substantially vertically extending from a portion of the first side member traversing the carriage support opening such that the second member is substantially disposed within the carriage support opening, the second side member having a longitudinally disposed elongated slot therein adapted to receive the second locking means for securing the template support plate to the angle guide rail.

22. The device of claim 21 which further comprises:

first indicia means disposed on the base plate and the carriage support plate for indicating the position of the carriage support plate with respect to the base plate;

second indicia means disposed on at least one of the rail members for indicating the position of the template assembly with respect to the rail members as the template assembly is movable across the carriage support opening; and third indicia means disposed on the template support plate and the template assembly for indicating the rotational position of the template with respect to the template support plate.

23. The device of claim 22 wherein the third indicia means comprises:

a plurality of first template indicia disposed around the template opening in the template support plate; and a plurality of second template indicia disposed along the perimeter of the template such that upon aligning the first template indicia with the second template indicia the rotatable position of the template with respect to the template support plate and thus the surface of the work piece can be determined.

* * * * *